L. P. GASTON.
DUMP CAR.
APPLICATION FILED APR. 15, 1908.
925,087.
Patented June 15, 1909.
3 SHEETS—SHEET 2.
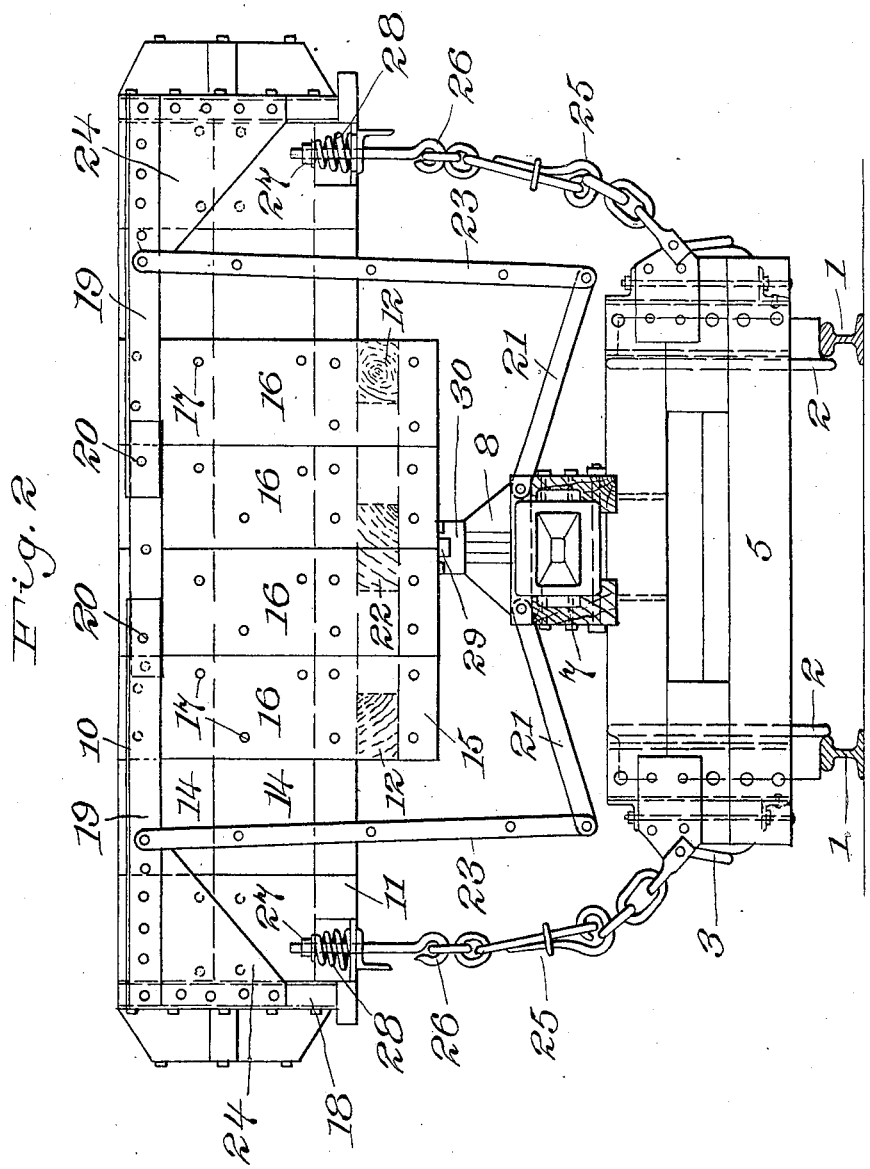

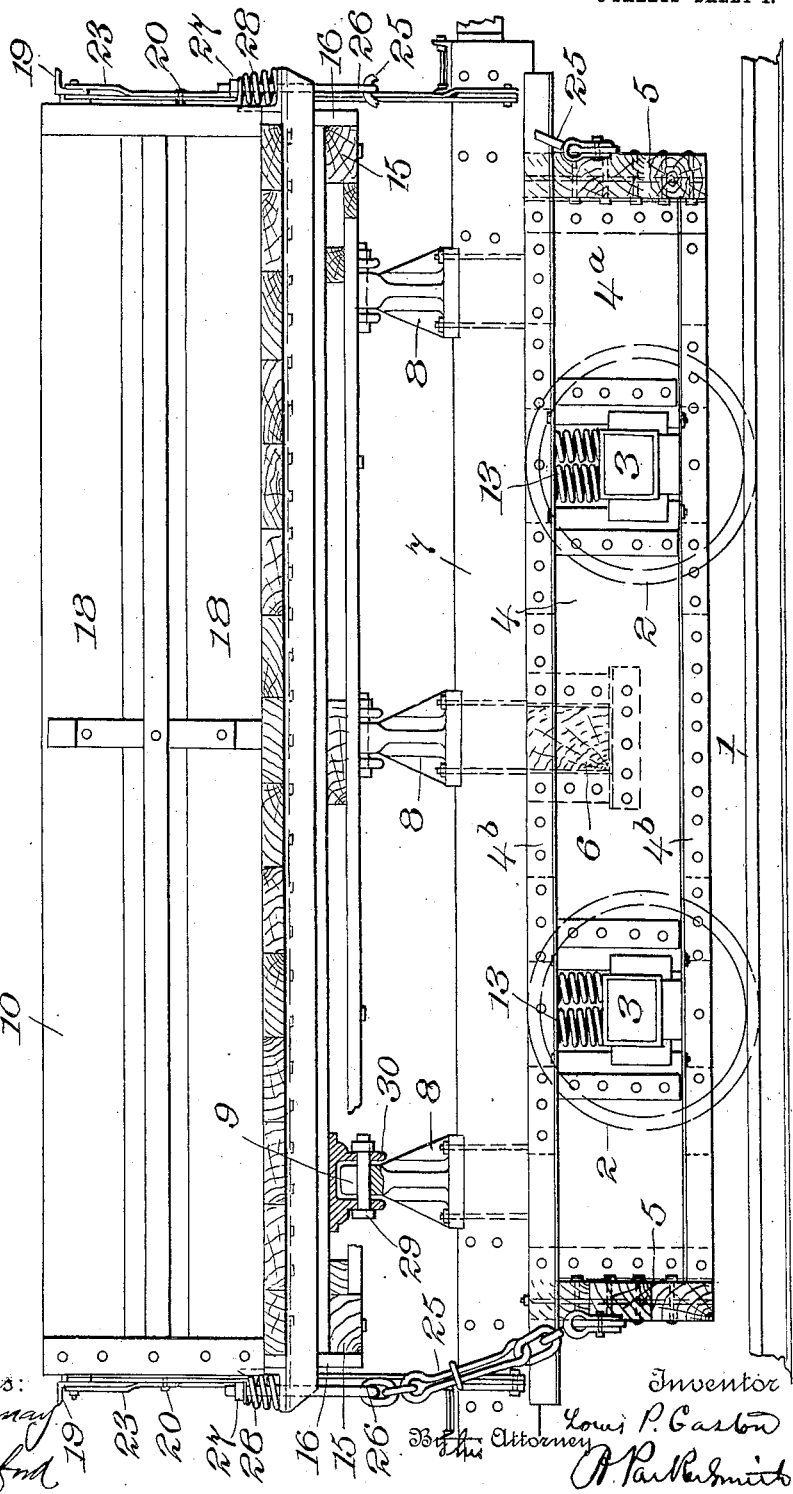

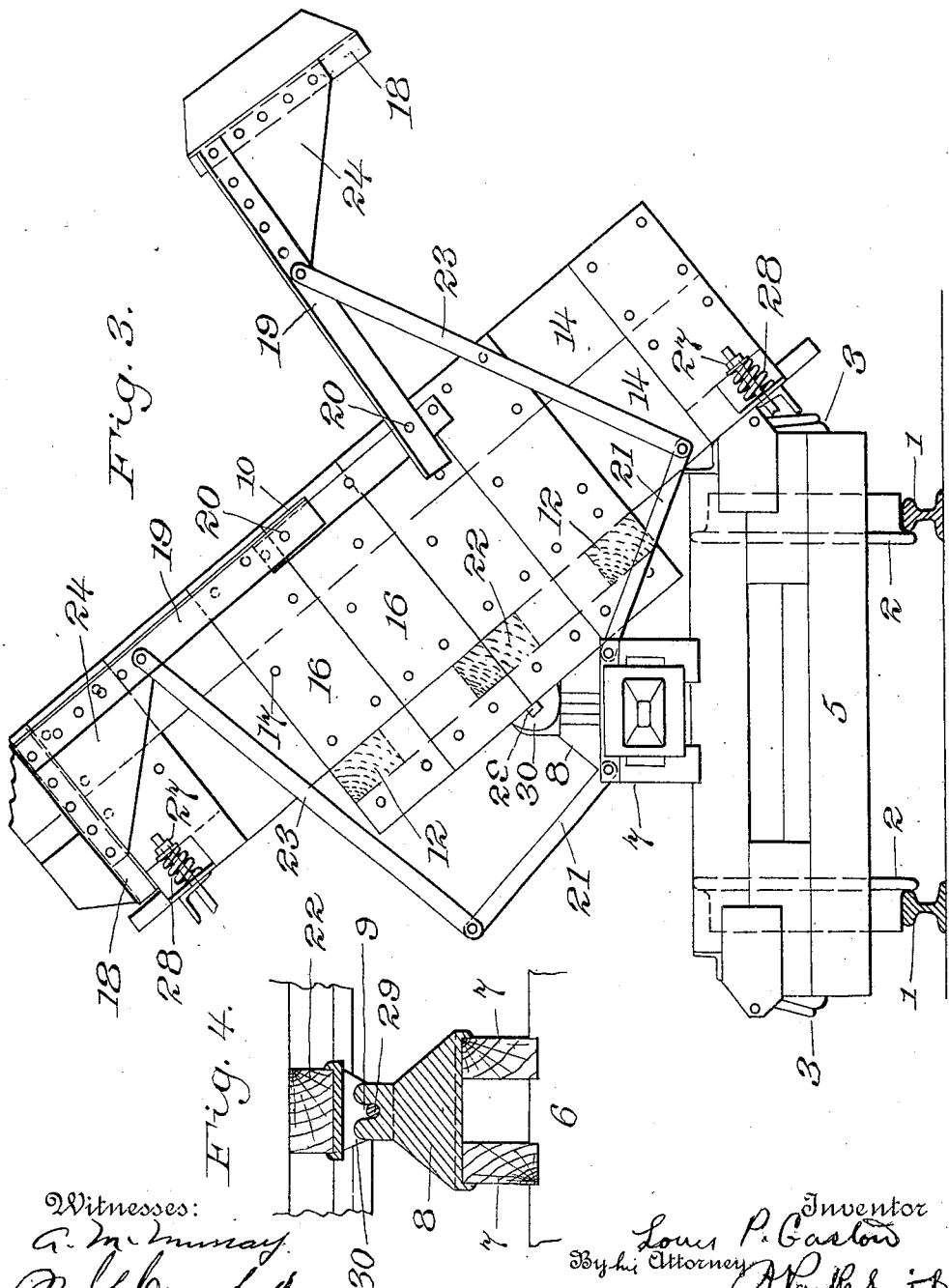

UNITED STATES PATENT OFFICE.

LOUIS P. GASTON, OF SOMERVILLE, NEW JERSEY.

DUMP-CAR.

No. 925,087.  Specification of Letters Patent.  Patented June 15, 1909.

Application filed April 15, 1908. Serial No. 427,254.

*To all whom it may concern:*

Be it known that I, LOUIS P. GASTON, a citizen of the United States of America, and a resident of Somerville, Somerset county, State of New Jersey, have invented certain new and useful Improvements in Dump-Cars, of which the following is a specification.

My invention relates to railroad cars in general, and is particularly applicable to the construction of small dump cars or tip cars. These dumping cars, as usually made, consist of a wheel truck and a separate car body hinged thereto. The hinges are along the middle longitudinal line of the under portion of the car body and as large quantities of dirt and rock are frequently dumped into these car bodies, the weight brings a severe strain on said body which is supported only at the middle at the point of hinging. Also as these dump cars are run over temporary tracks which are badly out of alinement, they are very apt to run off the track and tip over. In so running off the track, they are also apt to bring a large portion of the weight of the car upon the end of the truck frame, and twist said truck frame if made of ordinary construction. These and other difficulties in construction and operation in this type of car are overcome by my invention hereinafter described.

The best form of apparatus embodying my invention at present known to me is illustrated in the accompanying three sheets of drawings in which:

Figure 1 is a side elevation of the car with parts broken away. Fig. 2 is an end elevation. Fig. 3 is an end elevation with the car body tipped in a dumping position and the chains broken away, and Fig. 4 is a detail of the hinge connection.

Throughout the drawings, like reference figures indicate like parts.

1, 1, represent the rails of a truck on which rest the wheels 2, 2, of the car, which are journaled in journal boxes 3, 3, on which rest the springs 13, 13, supporting the plate girders 4, 4, which form the side portions of the truck frame. These girders are composed of plates 4ª and angle irons 4ᵇ riveted together. Cross end beams 5, 5, form a box frame for the truck with the side portions 4, 4, and 6 is an additional cross beam at the center of the truck.

Upon the cross beams rest the longitudinal center beam 7, on which are mounted the cast-iron pedestals 8, 8, provided in their upper ends with U-shaped sockets 9 in line with one another.

10 is the car body supported by means of the hinge pins 29, 29, resting in the U-shaped sockets 9, 9. These hinge pins are mounted in castings 30, 30, on which rests the longitudinal middle string piece 22. Two other longitudinal string pieces 12, 12, are provided under the car body, all the string pieces being fastened to the under side of the car body by the cross sills 11. False sills 15, 15, extend parallel to the other sills under the string pieces 12 and 22, and are bolted to the central string piece 22 and to string pieces 12, 12. The ends of the car body are composed of horizontally extending planks 14, 14, and these planks and the sills 11 and 15 are fastened together by a series of vertically arranged planks 16, 16, and bolts 17, or equivalent fastening devices.

The sides of the car body are formed of side boards 18, 18, supported on the outer ends of arms 19, 19, pivoted to the ends of the car body at 20, 20. These side boards are braced in their relation to the supporting arms by the triangular web pieces, 24, formed of plate iron or steel. These triangular web pieces extend nearly the whole width of the side boards and along the supporting arms 19 for nearly half the length of the latter.

Horizontal links 21, are pivoted to the truck frame, preferably to the center beam 7, and their other outer ends pivoted to the lower end of vertically extending links 23, 23, whose upper ends are pivoted to the arms 19, 19.

Chains 25, 25, extend from the outer sides of the truck frame to the outer portion of the ends of the car body to hold said car body in an approximately horizontal position on its pivotal points of support. Preferably these chains end in hooks 26, 26, which extend through openings in the car body and through spiral springs 28, 28, terminating in adjustable nuts 27, 27.

Such being the construction of my invention, the operation is as follows: To dump the car on one side, the chain on the other side is disconnected and the car body tipped over, the side board being lifted in the position shown in Fig. 3, allowing the contents of the car body to run out. The plate girders 4, forming the sides of the truck frame completely cover the wheels and overhang the rails also, preventing the contents of the car body from falling on or under the wheels or on the rails. The box frame for the truck formed by these plate girders and the end beams 5, prevents any of the material dumped from any of the cars from getting on to the wheels and axles of the cars. When the car body is tipped back to its horizontal position, the side board falls into its proper position and the triangular web piece 24 serves to make a tight closure at the corner of the car body, and also to hold the side board rigidly in position. Both functions coöperate to prevent the escape of any of the material deposited in the car body until the same is dumped.

Among the advantages resulting from my improved construction may be mentioned the additional strength given to the car body by the end construction employing the string pieces 12, 12, the false sills 15 and the vertical planks 16, 16. The weight supported by the string pieces 12, 12, bears upon the false sill 15, and by the vertical planks 16, 16, is transmitted to the horizontal planks 14, 14, forming the ends of the car body so that the whole of this end construction coöperates to form a built up plate girder to the strength of which every portion of the end construction of the car body contributes. Also when the car body is tipped by the deposit of a large quantity of material in one side of the car, there is a severe strain brought upon the chain upon the other side and liability to break the chain or other portions of the car. In my construction, this strain is eased up by the action of the springs 28, 28, and the life of the car much prolonged. The U-shaped socket and pin connection forming the hinge between the car truck and car body, is easily separable so that the car body may be lifted from the supporting sockets 9, when there is a tendency to upset the car, the car body then pivoting on the outer ends of one set of links 21, and the side of the truck, leaving the truck upon the rails instead of carrying the truck with it and precipitating the entire structure into the ditch, as might be the case if the hinge connection between the two parts were less easily separable. It is evident that in the additional tipping movement thus allowed the car body, it can completely free itself from its contents before its tipping movement can be transmitted to the truck. The advantage of the box frame construction of truck is that the wheels and track are protected from loose falling material, as above explained, and also in case the car runs off the track, the lower edge of the cross end beams 5, 5, quickly comes in contact with the rails and prevents the car tipping entirely over or the wheels being forced down very far between the ties. Even if completely derailed the car will still skid along the track on this box frame without falling low enough to break its couplings with adjacent cars, and without substantial injury. The plate girder construction also affords convenient means for getting a crowbar or jack into operation to lift the car back on the track, and the great strength of the construction prevents any warping or twisting of the truck frame in case of the numerous accidents of this type. The side board supporting arms 19, 19, are made of angle iron, giving lateral stiffness to the support for the side board when raised, and so insuring its proper registry with the car body when dropped again.

Having, therefore, described my invention, I claim:—

1. In a dump car, the combination with the tilting body, of side boards therefor, arms pivoted to the outside of the end walls of the car body and connected to the ends of the side boards near the upper edge thereof, and triangularly shaped web-pieces fastened along one edge to the arms, and along another to the ends of the side boards, and extending from the top of said side boards nearly to the bottom thereof.

2. In a dump car, the combination with the tilting body, of side boards therefor, arms formed of angle iron pivoted to the outside of the end walls of the car body and connected to the ends of the side boards near the upper edge thereof, and triangularly shaped web-pieces fastened along one edge to the arms, and along another to the ends of the side boards, and extending from the top of said side boards nearly to the bottom thereof.

3. In a dump car, the combination of the wheeled truck, provided with a series of centrally disposed bearing pieces provided with U-shaped sockets in line with one another, and a car body provided with a series of centrally and horizontally disposed hinge pins adapted to drop into said U-shaped sockets, together with a flexible system of pivoted links connecting the car body to the truck.

4. In a dump car, the combination of the wheeled truck provided with a box frame, a car body pivoted to the truck along its middle line, side boards for the car body, horizontally extending arms pivoted to the car body and connected to said side boards, a link pivoted to the middle portion of the truck and extending outward over the box frame, and a second link pivoted at one end to the outer extremity of the first link and at its other end to the arm supporting the side board, the hinge bearing connection between the car body and truck consisting of U-shaped socket pieces on the truck, and horizontally arranged pins on the car body adapted to rest in or lift upward out of said U-shaped sockets.

5. In a railroad car, a car body comprising in combination a plurality of longitudinally extending string pieces, cross sills at the ends of the car above and below the string pieces, a plurality of horizontally extending planks forming the ends of the car body, and a plurality of vertically extending planks fastened to the horizontal planks and the cross sills.

6. In a dump car, the combination with the wheeled truck, and a car body comprising a plurality of longitudinally extending string pieces, cross sills at the ends of the car above and below the string pieces, a plurality of horizontally extending planks forming the ends of the car body, and a plurality of vertically extending planks fastened to the horizontal planks and the cross sills, of a hinge connection between the wheeled truck and the middle one of the longitudinally extending string pieces.

Signed at New York, N. Y. this 9th day of April, 1908.

LOUIS P. GASTON.

Witnesses:
JNO. REM. GARRETSON,
THEO. R. SAURUS.